(12) United States Patent
Kessels et al.

(10) Patent No.: US 11,867,370 B2
(45) Date of Patent: Jan. 9, 2024

(54) LIGHTING DEVICE FOR MULTIPLE AUTOMOTIVE LIGHTING FUNCTIONS

(71) Applicant: LUMILEDS HOLDING B.V., Schiphol (NL)

(72) Inventors: Marcus Jozef Henricus Kessels, Echt (NL); Aloke Gaur, San Jose, CA (US)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 16/275,026

(22) Filed: Feb. 13, 2019

(65) Prior Publication Data
US 2020/0254920 A1  Aug. 13, 2020

(51) Int. Cl.
*F21S 41/24* (2018.01)
*F21S 43/14* (2018.01)
(Continued)

(52) U.S. Cl.
CPC ............ *F21S 41/24* (2018.01); *B60Q 1/0047* (2013.01); *B60Q 1/14* (2013.01); *B60Q 1/2607* (2013.01);
(Continued)

(58) Field of Classification Search
CPC ........ F21S 41/24; F21S 41/143; F21S 43/249; F21Y 2113/13; F21Y 2113/17; F21Y 2113/10; F21Y 2105/18
See application file for complete search history.

(56) References Cited

U.S. PATENT DOCUMENTS

| 2012/0081915 A1* | 4/2012 | Foote ................. B60R 1/12 362/494 |
| 2015/0049504 A1* | 2/2015 | Wu ..................... F21S 41/19 362/517 |

(Continued)

FOREIGN PATENT DOCUMENTS

| DE | 3916875 A1 | 12/1990 |
| DE | 102005048498 A1 | 4/2007 |

(Continued)

OTHER PUBLICATIONS

ECE-R6 (for turn light), United Nations Economic Commission for Europe (UNECE), UN Vehicle Regulations—1958 Agreement, Addenda to the 1958 Agreement, Uniform provisions concerning the approval of direction indicators for power-driven vehicles and their trailers, Addendum 5: Regulation No. 6, Revision 6 (Oct. 29, 2014).

(Continued)

*Primary Examiner* — Eric T Eide
(74) *Attorney, Agent, or Firm* — VOLPE KOENIG (57) ABSTRACT

An automotive lighting device, a vehicle and a method for operating an automotive lighting device are described. To economically fulfil different lighting functions the automotive lighting device includes a first and a second lighting unit. The first lighting unit is disposed to emit a first light of a first colour. The second lighting unit is disposed to emit a second light of a second colour different from the first colour. A mixing space is arranged to merge the first light and the second light to a third light of a third colour. The (Continued)

third light is disposed to fulfil a first automotive lighting function and the second light is disposed to fulfil a second automotive lighting function. The first automotive lighting function requires a colour within a first colour range and the second automotive lighting function requires a colour within a second colour range which is different from the first colour range. The third colour is within the first colour range and the second colour is within the second colour range.

15 Claims, 8 Drawing Sheets

(51) Int. Cl.
| | |
|---|---|
| *F21S 43/249* | (2018.01) |
| *F21S 43/16* | (2018.01) |
| *F21S 41/147* | (2018.01) |
| *F21Y 115/10* | (2016.01) |
| *B60Q 1/00* | (2006.01) |
| *B60Q 1/26* | (2006.01) |
| *B60Q 1/14* | (2006.01) |
| *B60Q 1/34* | (2006.01) |
| *B60Q 1/44* | (2006.01) |
| *F21S 41/176* | (2018.01) |
| *F21Y 113/13* | (2016.01) |

(52) U.S. Cl.
CPC ............... *B60Q 1/34* (2013.01); *B60Q 1/44* (2013.01); *F21S 41/147* (2018.01); *F21S 41/176* (2018.01); *F21S 43/14* (2018.01); *F21S 43/16* (2018.01); *F21S 43/249* (2018.01); *B60Q 2400/20* (2013.01); *B60Q 2400/30* (2013.01); *F21Y 2113/13* (2016.08); *F21Y 2115/10* (2016.08)

(56) References Cited

U.S. PATENT DOCUMENTS

| | | | |
|---|---|---|---|
| 2015/0277020 A1 | 10/2015 | Chen | |
| 2016/0061401 A1* | 3/2016 | Seyrlehner | B60Q 1/0041 362/509 |
| 2016/0109084 A1* | 4/2016 | Potter | F21S 43/235 362/511 |
| 2016/0369967 A1* | 12/2016 | Nakada | B60Q 1/2607 |
| 2017/0241614 A1* | 8/2017 | Vincens | F21S 43/255 |
| 2018/0345846 A1* | 12/2018 | Alisafaee | F21S 43/31 |

FOREIGN PATENT DOCUMENTS

| | | |
|---|---|---|
| DE | 102012017596 A1 | 3/2014 |
| DE | 102013221743 A1 | 4/2015 |
| EP | 1637397 A1 | 3/2006 |
| EP | 2161494 A1 | 3/2010 |
| EP | 2599665 A2 | 6/2013 |
| EP | 2803903 A1 | 11/2014 |
| EP | 2826668 A1 | 1/2015 |

OTHER PUBLICATIONS

ECE-R7 (for stop light), United Nations Economic Commission for Europe (UNECE), UN Vehicle Regulations—1958 Agreement, Addenda to the 1958 Agreement, Uniform provisions concerning the approval of front and rear position lamps, stop-lamps and end-outline marker lamps for motor vehicles (except motor cycles) and their trailers, Addendum 6: Regulation No. 7, Revision 6 (Nov. 22, 2012).

ECE-R87 (for daytime running light), United Nations Economic Commission for Europe (UNECE), UN Vehicle Regulations—1958 Agreement, Addenda to the 1958 Agreement, Uniform provisions concerning the approval of daytime running lamps for power-driven vehicles, Addendum 86: Regulation No. 87, Revision 3 (Aug. 20, 2013).

\* cited by examiner

LIGHTING DEVICE FOR MULTIPLE AUTOMOTIVE LIGHTING FUNCTIONS

FIELD OF INVENTION

The invention relates to an automotive lighting device, a vehicle including the automotive lighting device and a method of operating an automotive lighting device. More particularly, the invention relates to an automotive lighting device that is disposed to emit light of different colours.

BACKGROUND

In automotive lighting, LED lighting elements are used more and more due to the inherent advantages such as long lifetime, energy efficiency, and small size.

A vehicle conforming with traffic regulations needs different lighting units that have to meet individual requirements and to fulfil regulations to perform different lighting functions such as daytime running light, turn light or stoplight. Consequently, current vehicles comprise several lamps, each designated to fulfil an assigned, individual task set and limited by regulations. Therefore, lighting is a very complex and laborious challenge when manufacturing and operating a vehicle.

SUMMARY

It may be considered an object to provide an automotive lighting device, a vehicle including the automotive lighting device and a method of operating an automotive lighting device that economically fulfil different lighting functions.

This object is achieved by an automotive lighting device according to claim 1, by a vehicle including the automotive lighting device according to claim 13, and by a method of operating an automotive lighting device according to claim 14. Dependent claims refer to preferred embodiments of the invention.

A first lighting unit is disposed to emit a first light of a first colour. The term "lighting unit" is used herein to refer to any configuration comprising one or more light sources. While one or both of the lighting units may comprise different types of light sources such as e.g. incandescent lamps, the lighting units are preferably comprised of one or more LED elements. The term "LED element" is used here to refer to any type of single solid state lighting element or group of solid state lighting elements, such as light emitting diodes, laser diodes, organic light emitting diodes (OLED) and the like. It may be advantageous to compose a lighting unit of several light sources because different arrangements of the lighting units are then possible. Thus, the shape of the lighting units may be adapted flexibly to the desired purpose.

A second lighting unit is disposed to emit a second light of a second colour that is different from the first colour. A mixing space is arranged to merge the first light and the second light to a third light of a third colour. The third light is disposed to fulfil a first automotive lighting function which requires a colour within a first colour range. The second light is disposed to fulfil the second automotive lighting function which requires a colour within in the second range. The first and the second colour are chosen such that the third colour is within the first colour range and that the second colour is within the second colour range.

The first and the second automotive lighting function are defined for vehicles, e.g. for cars, where light sources may be employed for different purposes, including illumination and signalling. There are a number of well-defined automotive lighting functions, such as e.g. for a stoplight, turn light, high/low beam, fog light, daytime running light, curve light etc. The automotive lighting functions may be defined with regard to several aspects concerning the emitted light, such as colour, beam shape, luminous flux, etc. Further properties of the lighting functions may be defined, e.g. if a light source is illuminated permanently or in predetermined intervals. The requirements for the light disposed to fulfil the different lighting functions, and in particular the required colour, are defined in corresponding regulations, such as for example ECE-R87 for daytime running light, ECE-R6 for turn light, and ECE-R7 for stoplight.

Thus, the automotive lighting device is disposed to fulfil two different lighting functions on the one hand with the third light, that is composed of the first and the second light, and on the other hand with the second light. The second light may be used for both lighting functions of the automotive lighting device and the lighting functions may only differ in selectively adding the first light. Therefore, the second lighting unit may contribute to fulfil both automotive lighting functions. This use of the second lighting unit for two different purposes can increase the efficiency of the automotive lighting device.

Further, it may be an advantage to use one single lighting device disposed to fulfil two different automotive lighting functions such as a daytime running light and turn light, or turn light and stoplight.

The colour of the third light depends on both colours, the colour of the first light and the colour of the second light. The third light is created within the mixing space by merging the first and the second light. Thus, the colour of the third light may be one of all possible combinations out of the first and the second colour. These colour combinations may be illustrated using a CIE 1931 chromaticity diagram. Both, the first and the second colour can be represented as a colour point within this diagram. Between the colour points, a straight line connecting these two colour points comprises all colour points that may represent all possible colours of the third light. The colour of the third light is within the first colour range. Thus, the straight line between the colour point of the first colour and the colour point of the second colour crosses the first colour range and each point of the straight line lying within the first colour range may represent the colour of the third light.

In an embodiment, the first automotive lighting function may be a daytime running light (DRL) and the second automotive lighting function may be a turn light. The first automotive lighting function preferably fulfils the regulation ECE-R87 while emitting light with a colour out of the first colour range. This first colour range may preferably be represented by a region within the CIE 1931 chromaticity diagram that may be defined as a polygon. The coordinates of the first vertex are (0.31, 0.348), of the second vertex (0.453, 0.44), of the third vertex (0.5, 0.44), of the fourth vertex (0.5, 0.38), of the fifth vertex (0.44, 0.38), and of the sixth vertex the coordinates are (0.31, 0.283). All vertices are connected by straight lines to each other. The first vertex is connected to the second vertex, that is connected to the third vertex, that is connected to the fourth vertex, that is connected to the fifth vertex, that is connected to the sixth vertex that is then connected to the first vertex.

The second lighting unit preferably fulfils the regulation ECE-R6 by emitting light with a colour out of the second colour range. The second colour range may be defined as a second region in the CIE 1931 colour space. This second colour region may be a geometric shape with the vertices (0.545, 0.425), (0.56, 0.44), (0.609, 0.39), and (0.597, 0.39).

Preferably it may approximately be a quadrangle. Preferably, the first vertex may be connected by a straight line to the second vertex, the second vertex may be connected by a segment of the spectral locus to the third vertex, the third vertex may be connected by a straight line to the fourth vertex and the fourth vertex may be connected by a straight line to the first vertex such that a coherent area may be bordered. The second and the third vertex may preferably be part of the spectral locus and the segment of the spectral locus between those vertices may connect them.

In this embodiment, the defined first region in the CIE 1931 chromaticity diagram includes all the colour points that are white according to the regulation ECE-R87. Thus, the second colour, according to regulation ECE-R6, is not white but amber and its blue colour component is discernibly lower than the blue component of the third light.

In a further embodiment, the first automotive lighting function may be a turn light and the second automotive lighting function may be a stoplight. The first automotive lighting function fulfils preferably the regulation ECE-R6 while emitting light with a colour out of the first colour range. This first colour range may preferably be represented by a geometric shape with the vertices (0.5545, 0.425), (0.56, 0.44), (0.609, 0.39), and (0.597, 0.39). Preferably it may approximately be a quadrangle. The first vertex may be connected by a straight line to the second vertex, the second vertex may be connected by a segment of the spectral locus to the third vertex, the third vertex may be connected by a straight line to the fourth vertex and the fourth vertex may be connected by a straight line to the first vertex such that a coherent area may be bordered. The second and the third vertex may preferably be part of the spectral locus and the segment of the spectral locus between those vertices may connect them. Then, the colour of the third light is amber according to the regulation ECE-R6.

The second automotive lighting function according to this embodiment may be a stoplight according to the regulation ECE-R7. The light of the second colour is within a second colour range. This second colour range may preferably be represented by a region that may be defined as a geometric shape with the four vertices (0.65, 0.33), (0.67, 0.33), (0.735, 0.265), and (0.721, 0.259). Preferably, it may approximately be a quadrangle. The first vertex may be connected by a straight line to the second vertex, the second vertex may be connected by a segment of the spectral locus to the third vertex, the third vertex may be connected by a straight line to the fourth vertex and the fourth vertex may be connected by a straight line to the first vertex such that a coherent area may be bordered. The second and the third vertex may preferably be part of the spectral locus and the segment of the spectral locus between those vertices may connect them. The second lighting unit emitting a light of a colour chosen out of the second colour range may emit a colour that is red.

According to a further embodiment, the first colour is within the first colour range. According to this embodiment, both the first and the third light may be within the first colour range and both may be of a colour required by the first lighting function. In case of a failure of the second lighting unit, the automotive lighting device would eventually only emit the first light which is still disposed to fulfil the first lighting function.

According to a further embodiment, each of the lighting units may be independently controllable. Lighting units may be switched on and switched off independently of each other. They may also be dimmed selectively to emit a desired luminous flux. This flexibility allows to perform different operation modes such as to use selectively only one lighting unit or both lighting units at the same time. According to this embodiment, it is possible to choose the desired light output by switching between the respective operation modes.

In particular, the automotive lighting device may be disposed to be operated selectively in one of at least two operation modes, whereby in the first operation mode light of a colour that is within the first colour range is emitted and in the second operation mode light of a colour that is within the second colour range is emitted.

Thus, the first operation mode may implement the first lighting function which may be a daytime running light or a turn light and the second operation mode may implement the second lighting function which may be a turn light or a stoplight. The first operation mode may be realised preferably by operating both lighting units simultaneously. The second operation mode may be realized by operating the second lighting unit solely.

According to one embodiment, the first lighting unit may also be operated alone such that the lighting device emits light of the first colour. This light may fulfil a traffic regulation such that it may implement an automotive lighting function. It may also be disposed to serve another purpose that is not restricted by traffic regulations such that it implements a lighting function which may not necessarily be an automotive lighting function, such as e.g. a greeting light.

Preferably, the automotive lighting device may be controlled by a control unit. The control unit may receive control signals in order to operate the lighting units selectively in one of the two different operation modes.

Thus, in the automotive lighting device, there are two different usages of the second lighting unit. Either it is driven alone or it is driven to add its own luminous flux to that of the first lighting unit. If the second lighting unit is driven alone, the first lighting unit does not emit light and the automotive lighting device emits light with the colour and the luminous flux of the second lighting unit. If both lighting units are driven simultaneously, the luminous flux of the second lighting unit is added to that of the first lighting unit. In this case, the lighting device emits light with the third colour which is within the first colour range and with a luminous flux that is the sum of the luminous fluxes of both lighting units.

This flexibility enables increasing the efficiency of the lighting device. The thermal energy may be distributed over a larger number of light sources. There are several further possibilities to use this gained efficiency.

On the one hand, the automotive lighting device may achieve a higher total luminous flux of light in the first colour range by adding the luminous flux of the second lighting unit to that of the first lighting unit. The luminous flux of each lighting unit may be chosen according to the desired case of application. Preferably, the luminous flux may be higher than 200 lm. Further preferred, the luminous flux of each lighting unit may be within a range of 350-500 lm. To achieve a desired luminous flux of a colour that is within the first colour range the luminous flux of the first lighting unit may be less than the desired total one if the luminous flux of the second lighting unit is added in an appropriate manner. Then, the drive current supplying the light sources may be less than the drive current if only the first lighting unit is driven. A lower drive current reduces the heat losses and is therefore favourable. A lower operating temperature may lead to a longer lifetime of the light sources.

On the other hand, the number of light sources in the first lighting unit and therefore in the automotive lighting device may be less than would be required if each lighting unit would need to fulfil the requirements separately. This may have a positive effect on the manufacturing costs of the automotive lighting device. Furthermore, the automotive lighting device may be of overall smaller size if less light sources are required.

To realise another embodiment, the luminous flux of a lighting unit may be variable relative to the other one. Thus, it is possible to tune the third colour that is composed by the first and the second colour. If two colours were given as colour points in the CIE 1931 chromaticity diagram, all colour points on a straight line that connects these two points are achievable from the given two colour points. The ratio of the luminous fluxes of the light emitted from the first and from the second lighting unit, the colour of which corresponds to the two colour points, determines the exact colour point on this straight line that represents the colour of the emitted third light according to this embodiment. E.g. by increasing the luminous flux of the light emitted from the first lighting unit, the colour point of the third light obtained from mixing of the first and second light changes its position along the straight line between the first and second colour points to a position that is closer to the first colour point. If the luminous flux of the light emitted from the second lighting unit is increased, the colour point of the third light changes its position along the line to a position that is closer to the second colour point. All colour points on the straight line may be chosen as the third colour if they are within the first colour region.

The luminous flux of one lighting unit may be variable and the other one may be fix. Preferably, both luminous fluxes are variable so that the colour hue and the luminous flux of the third light are easily tuneable.

In a preferred embodiment, each lighting unit may comprise a plurality of LED elements and at least one of the lighting units may be at least partially covered by a common light emitting layer. Preferably, the common light emitting layer may cover the whole lighting unit. Such a light emitting layer may be arranged on top of the LED elements, e.g. on a LED die. The LED emits light that illuminates the light emitting layer. The light emitting layer converts fully or partially the wavelengths of the incoming light such that the light emitted from the lighting unit is of another colour. This colour of the emitted light depends on the material of the light emitting layer. Such a light emitting layer may comprise a doted phosphor as a material. Other light emitting materials may also be used. Therefore, the light emitting layers of this embodiment may generate the required colours of the first and of the second light.

Preferably, at least one lighting unit comprises a common type of LEDs. Further preferred, all LEDs of the automotive lighting device are of a common type of LED. The different colours may then be achieved by different light emitting layers arranged on top of the LEDs. The use of common LED types and the use of common light emitting layers for the lighting units facilitates the manufacturing of the automotive lighting device.

Different arrangements of the lighting units in relation to each other are possible, e.g. to achieve a desired beam shape. In particular, the gap and the border between the lighting units may be considered as they may be relevant for beam forming. Furthermore, the shape of each lighting unit may be chosen to achieve a desired result.

While it is possible to arrange the lighting units at a distance, such that there may be a gap between the lighting units, it is preferred to arrange the lighting units adjacent to each other in order to enhance the merging of the first and of the second light. If the lighting units are adjacent to each other, the beam of the first light and the beam of the second light have a larger overlap compared to a configuration wherein the lighting units are arranged further away of each other. A large overlap is preferred because a human eye perceives this overlap of the first and the second light as a third light of a third colour. Thus, the first and the second light are preferably not separately perceptible. It may be more likely that a human eye would perceive two adjacent lighting units as one single light source than two lighting units that are arranged at a significant distance. Thus, in use as an automotive light it may be favourable if the lighting units are arranged close to each other such that a human eye may perceive the two light beams as one single light beam similar to one a single light source would emit.

Preferably, an optical element may be arranged within the mixing space to assist the mixing process. Any type of optical element may be used that has optical properties to alter the emission direction of light emitted from one or both of the lighting units. For example, a diffusor element may be used to improve light mixing. Further preferred may be an element with reflective surfaces which are illuminated by both lighting units. The incident light of both lighting units is reflected between these reflective surfaces and merges to a third light. In a particularly preferred embodiment, a light guide may be arranged within the mixing space. Any translucent or preferably transparent object with a higher optical density than air, which enables propagation of light within itself and total internal reflection at boundary surfaces, may be considered a light guide. Arrangement of a light guide in the mixing space may improve the mixing of the first and the second light such that they are hardly or no longer separately perceptible. Due to the light guide characteristics the light is reflected within the light guide. This reflection and therefore the mixing process is adjustable. The light may be outcoupled from the light guide and emitted at a desired position and in a desired directional manner. The reflection within the light guide depends on the angle of incidence of the light but not on the wavelength of the light. Thus, if the first and the second light are coupled into the light guide, they pass through the same reflection and may then be outcoupled together as one emitted beam. Preferably, a desired beam form may be achieved by designing an output coupling area in an appropriate manner.

To perform the outcoupling process, in a preferred embodiment, the light guide comprises an output coupling area. This output coupling area serves to emit light conducted by the light guide, preferably while adjusting the beam form in a desired manner. Thus, the outcoupling can be adapted suitable to a specific application of the automotive lighting device. The amount and the position of the outcoupled light of the automotive lighting device can be chosen. The output coupling area may e.g. emit a focused beam. Another possibility is to only guide a beam and to emit it at another position with the same beamform. Furthermore, it may be advantageous to scatter the light to broaden the light beam. The beam characteristics may be adjusted to obtain ones similar to those commonly used in automotive lighting. To employ the automotive lighting device on a car, it may be favourable to scatter and broaden the light beam. In a preferred embodiment, an output coupling area of a light guide may be arranged conforming to the shape of a vehicle body.

In a further embodiment the light guide may be shaped cylindrically. The base of this cylinder may be any shape, preferably a polygon or a circle. The material of the light guide may be glass, glass fibre, acrylic glass, any plastic or other light guiding material. A cylindrical light guide is easy to manufacture and provides total reflection processes that are the same at every position within the light guide. The light guide may be bendable such that it can be arranged to follow the contour of a vehicle. The light guide is preferably made out of a solid material and advantageously already has a shape conforming with the shape of the vehicle body.

The lighting units according to a further embodiment may be arranged such that at least one lighting unit encloses the other at least partially. This arrangement may serve to improve mixing. An inner lighting unit may be formed, e.g. in the shape of a polygon or a circle. An enclosing lighting unit may also have a circle or polygon shape. Preferably, the enclosing lighting unit may form at least partially an annulus and the inner lighting unit may form a circle. In an enclosed or partially enclosed arrangement, the ratio of the length of the border between the lighting units and the longest extension of the smaller of the lighting units is relatively high, which is preferable because it enhances the light mixing. Despite the long boundary the whole configuration may exhibit compact dimensions. The automotive lighting device according to this embodiment could generate a compact and circular light beam in both operation modes. Furthermore, this embodiment is well adapted to a cylindrical shape of the light guide. The circular base of the light guide may be connected to the lighting units such that it covers the lighting units preferably completely. Any other arrangement of the lighting units is possible but arrangements that lead to a good mixture of the different colours of the emitted lights and to a good directivity of the radiated light are preferred.

BRIEF DESCRIPTION OF THE DRAWINGS

The above and other features and advantages of the present invention will become apparent from the following description of preferred embodiments, in which.

DETAILED DESCRIPTION OF THE PREFERRED EMBODIMENTS

Figure 1:
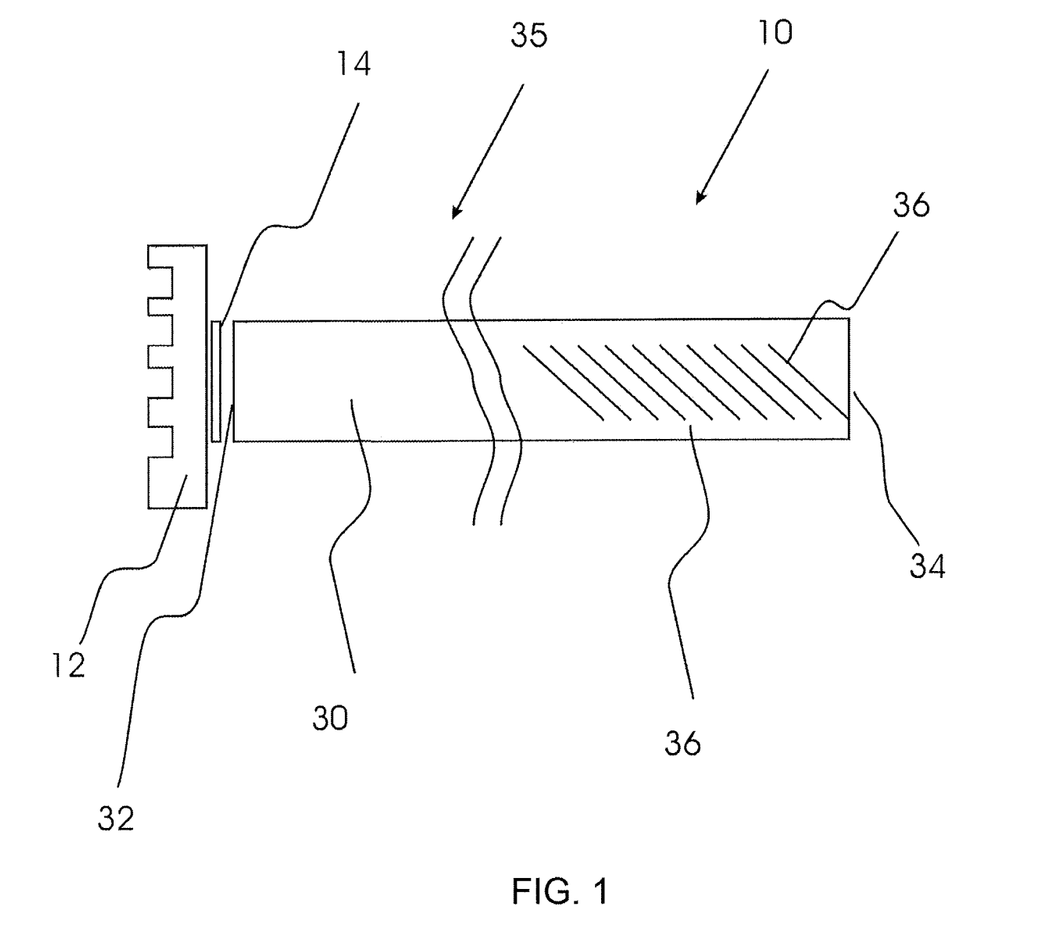
FIG. 1 shows a side view of an embodiment of an automotive lighting device including a light source assembly.

FIG. 1 shows an automotive lighting device 10 in side view. The automotive lighting device 10 comprises a heat sink 12 on which a light source assembly 14 is arranged. A light guide 30 is arranged to receive light emitted from the light source assembly 14.

Figure 2:
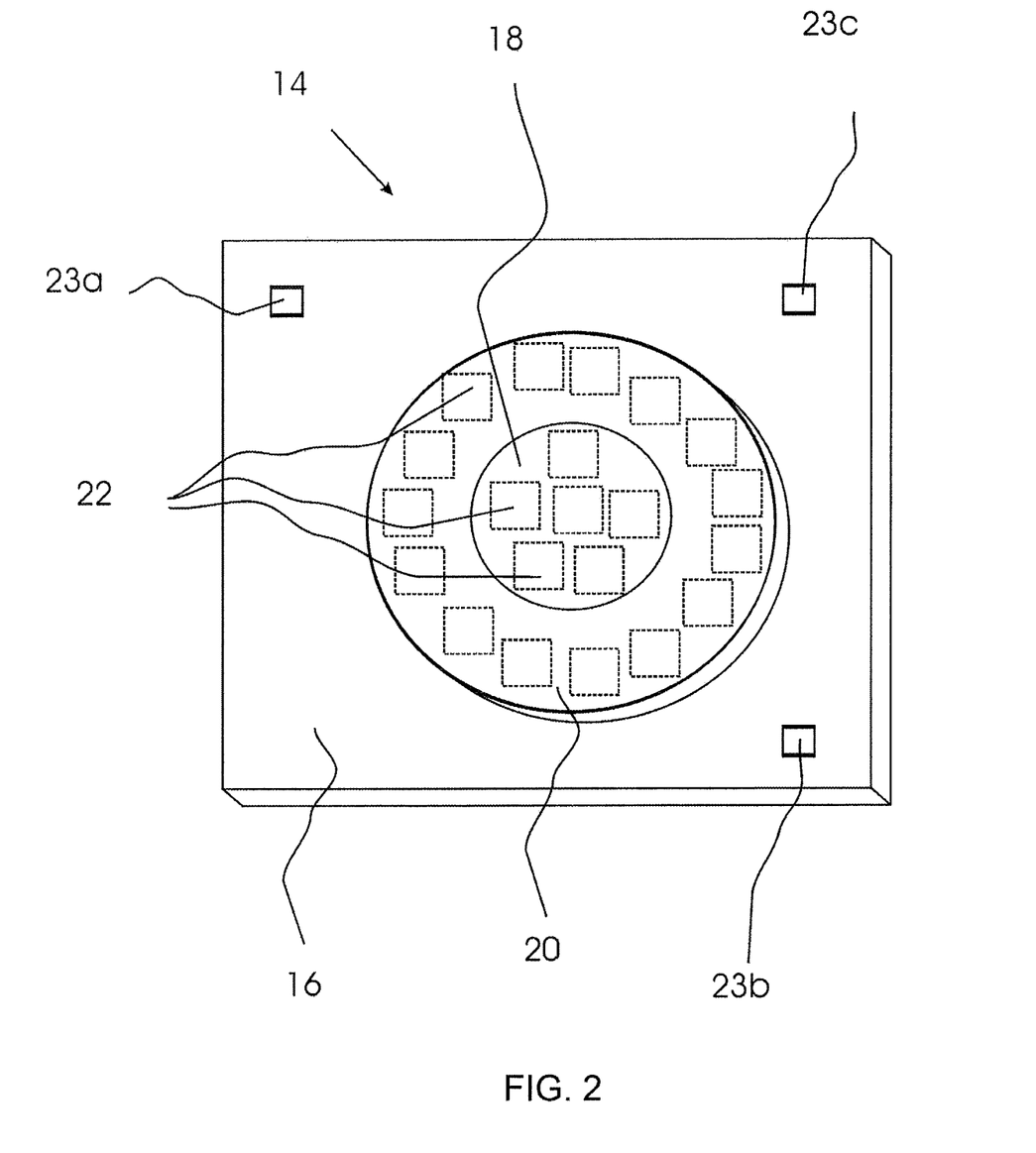
FIG. 2 shows a top view of the light source assembly of FIG. 1.

FIG. 2 shows a top view of the light source assembly 14. The light source assembly 14 mounted on a substrate 16 comprises a first lighting unit 18 and a second lighting unit 20 each comprising several LEDs 22. As visible e.g. from FIG. 3, the LEDs 22 of the first lighting unit 18 are covered by a first common light emitting layer 24 and the LEDs 22 of the second lighting unit 18 are covered by a second common light emitting layer 26.

The LEDs 22 belonging to the first lighting unit 18 are electrically connected, e.g. in a series connection, to electrical pads 23a, 23b. Thus, all LEDs 22 of the first lighting unit 18 are driven simultaneously by applying electrical power to the pads 23a, 23b. The LEDs 22 belonging to the second lighting unit 20 are electrically connected, e.g. as a series connection, to electrical pads 23b, 23c, such that they may be driven simultaneously by applying electrical power to these pads 23b, 23c. The lighting units 18, 20, while sharing the pad 23b as a common terminal, are thus independently operable.

The first common light emitting layer 24 of the first lighting unit 18 is of circular shape. The LEDs 22 of the first lighting unit 18 are roughly arranged in a circle. The second common light emitting layer 26 of the second lighting unit 20 is of annular shape. The LEDs 22 belonging to the second lighting unit 20 are arranged in a circle.

The second lighting unit 20 encloses the first lighting unit 18. The common light emitting layers 24, 26 are arranged adjacent or with only minimal gap. The lighting units 18, 20 are thus arranged directly adjacent to each other and the border between the lighting units 18, 20 forms a circle.

Figure 3:
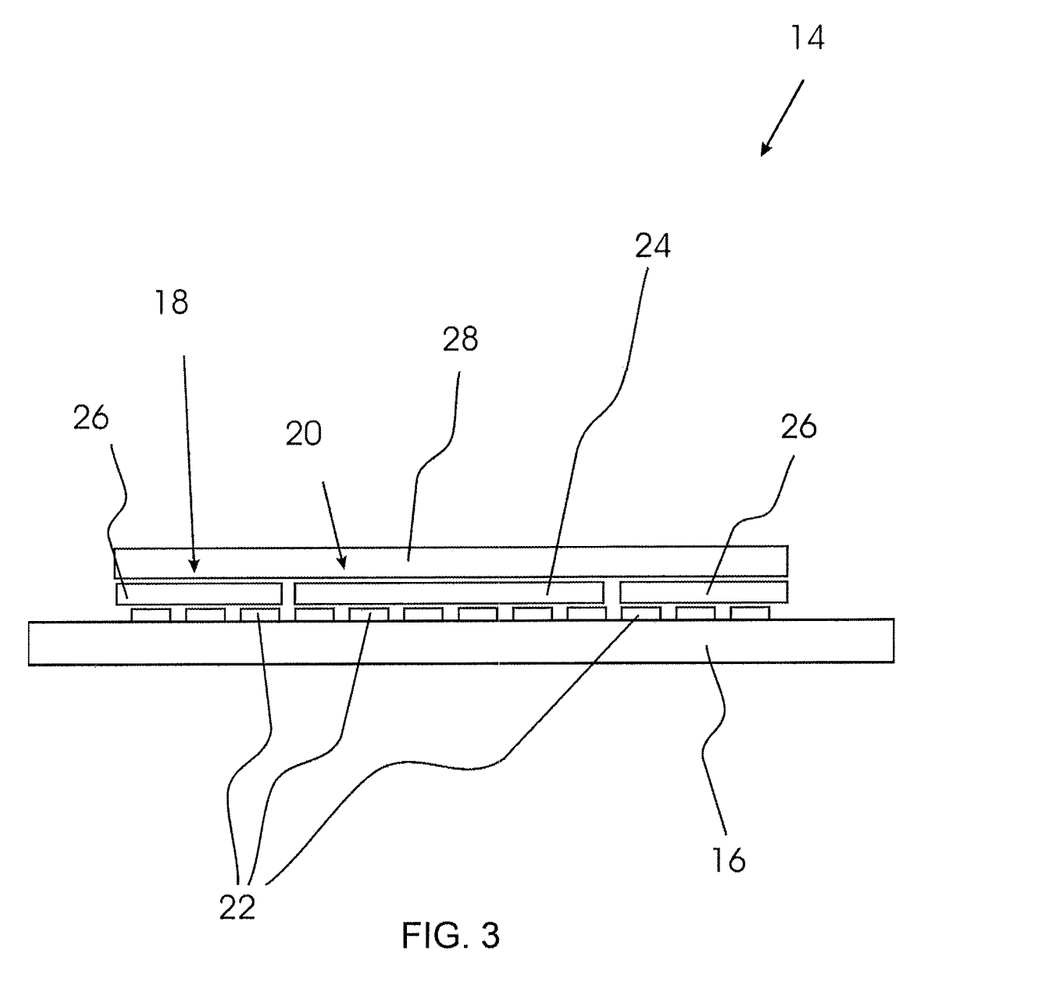
FIG. 3 shows a sectional view of the light source assembly of FIGS. 1 and 2.

FIG. 3 shows the light source assembly 14 in section. As shown, the common light emitting layers 24, 26 on top of the LEDs 22 are covered by a transparent silicone layer 28. The substrate 16 and the transparent silicone layer 28 sandwich the LEDs 22 and the common light emitting layers 24, 26.

The LEDs 22 of both lighting units 18, 20 are each of the same type. In operation, they emit (blue) light of the same wavelength. The common light emitting layers 24, 26 are made of differently doted phosphor materials, such that the light of the LEDs 22 is converted to the light of different wavelengths that is emitted through the transparent silicone layer 28. The blue light emitted by the LEDs 22 of the first lighting unit 18 is converted to cyanic white light and the blue light emitted by the LEDs 22 of the second lighting unit 20 are converted to amber light.

Figure 4A:
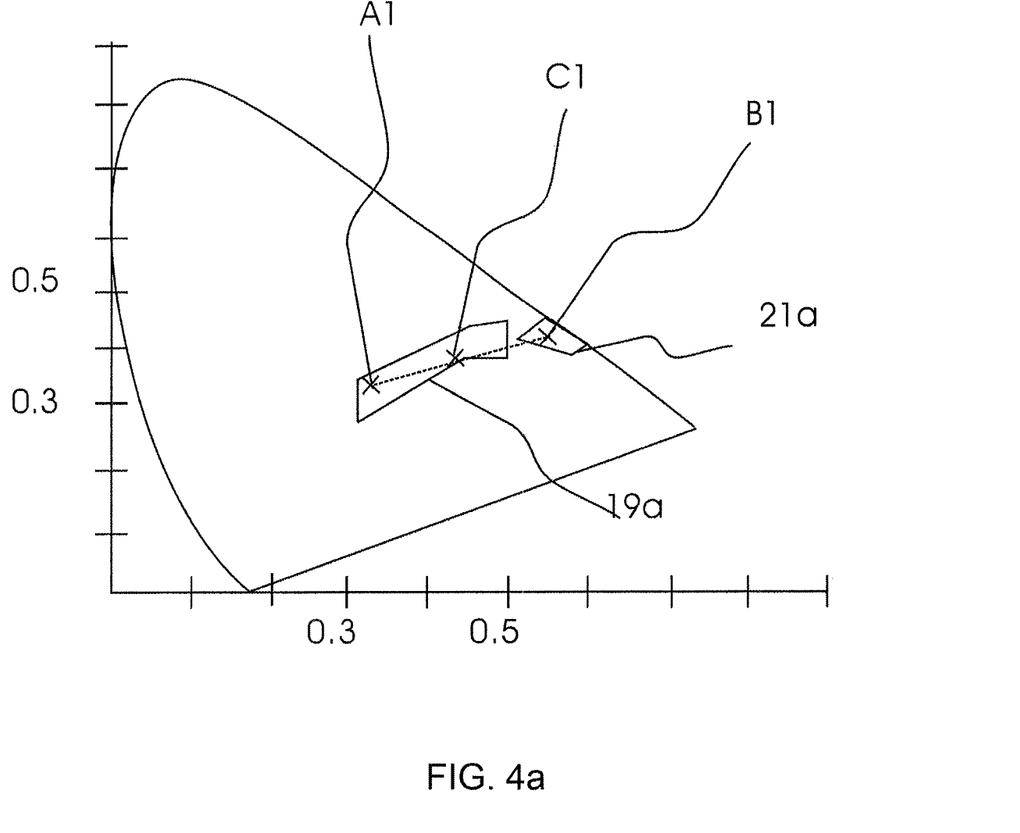
FIGS. 4a, 4b, and 4c show CIE 1931 chromaticity diagrams with different colour windows.

FIG. 4a shows a CIE 1931 chromaticity diagram to illustrate a first embodiment. Based on this diagram, the two different colours emitted by the lighting units 18, 20 are chosen. There are two different, disjoint colour windows 19a, 21a. A first colour window 19a is a white colour window defining permissible colours for a daytime running light (DRL) according to ECE-R87. A second colour window 21a is an amber colour window defining permissible colours for a turn light according to ECE-R6.

The colour of the first light 32 emitted from the first common light emitting layer 24 covering the first lighting unit 18 is designated as colour point A1, which is within the first (white) colour window 19a. The colour of the second light 34 emitted from the second common light emitting layer 26 covering the second lighting unit 20 is represented by the colour point B1 within the second (amber) colour window 21a.

The colour of a third light 33 obtained from mixing the first light 32 and second light 34 is designated as color point C1. In the CIE 1931 chromaticity diagram, the colour point C1 lies between the colour points A1 and the colour point B1. It is a feature of CIE 1931 chromaticity diagrams that two colour points can be combined to each colour point between those two colour points. Therefore, the colour corresponding to the colour point C1 is a combination of the colours corresponding to the colour points A1 and B1.

As shown in FIG. 4, the colour point C1 is also located within the first colour window 19a. Thus, the colour point C1 also represents a white colour hue permissible as a DRL according to ECE-R87. As the colour of the first and the colour of the third light both fulfil the regulation ECE-R87, this embodiment is able to realise a daytime running light in two different ways: Either with the first light emitted by the lighting device if only the first lighting unit is operated, or with the third light emitted by the lighting device if the first lighting and the second lighting units are operated simultaneously.

Figure 5A:
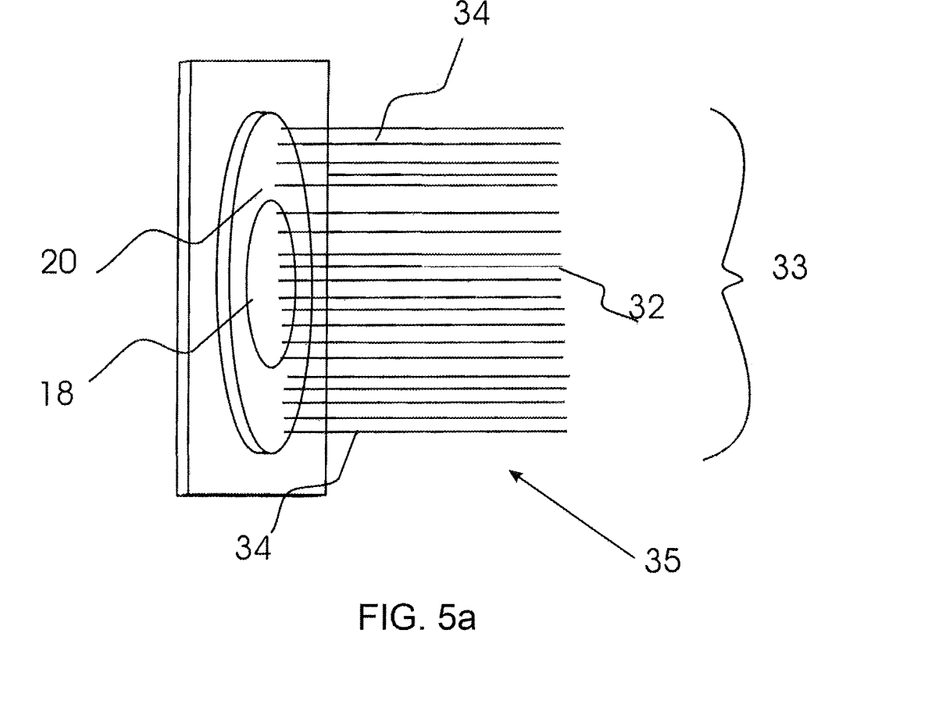
FIGS. 5a and 5b show perspective views of the light source assembly of FIGS. 1-3 in two different operation modes.
Figure 5B:
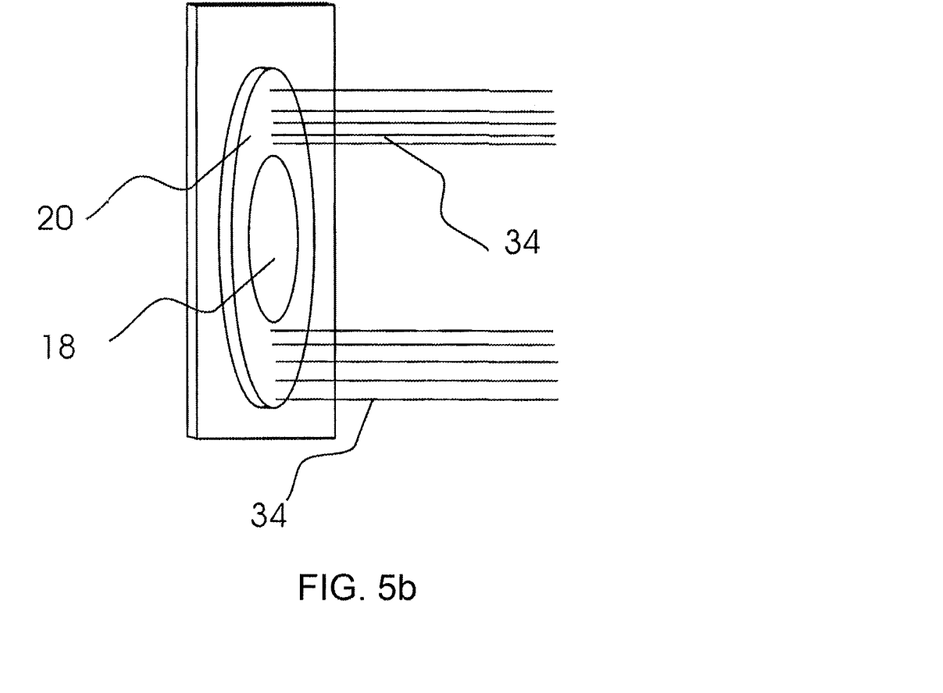

FIG. 5a and FIG. 5b show two operation modes of the light source assembly 14. As explained above, the lighting units 18, 20, if operated alone, emit light 32, 34 of the colours corresponding to the colour points A1 and B1. If both the first and the second lighting unit 18, 20 are operated simultaneously, first light 32 emitted from the first lighting unit 18 and second light 34 emitted from the second lighting unit 20 mix to third light 33 of a third colour which corresponds to the colour point C1.

FIG. 5a shows a first operation mode in which both lighting units 18, 20 are operated to emit light. The inner first lighting unit 18 emits first light 32, the colour of which is white corresponding to the colour point A1. The enclosing second lighting unit 20 emits second light 34 of the colour amber according to the colour point B1.

The first and second light 32, 34 is merged in a mixing space in front of the light source assembly 14 to a third light 33 of a third colour corresponding to the colour point C1 which is within the first colour window 19a. The light source assembly 14 emits in this operation mode light of the colour represented by the colour point C1.

FIG. 5b shows a second operation mode in which only the second lighting unit 20 is operated to emit second light 34. The light source assembly 14 emits in this operation mode second light 34 of amber colour represented by the colour point B1.

Back in FIG. 1, the light guide 30 is provided in front of the light source assembly 14 such that light emitted from the light source assembly 14 is coupled into the light guide 30. The light guide 30 is shaped cylindrically and has circular ends 42, 44. A first circular end 42 is arranged in front of the light source assembly 14 and the axis of the cylindrical light guide 30 is collinear with the main propagation direction of the light emitted by the light source assembly 14. The light guide 30 is made of transparent, flexible material. A second circular end 44 that is arranged opposite to the light source assembly bordering the first circular end 42 is part of an output coupling portion 36 of the light guide 30.

While the light guide 30 is shown as straight in FIG. 1, it may be bent due to the flexibility of the light guide material. In FIG. 1, the light guide 30 and the output coupling portion 36 are illustrated collinear but the shape of the light guide 30 can be adjusted such as to be arrangeable alongside a vehicle body.

In the first operation mode, the mixing of the first light 32 that is emitted by the first lighting unit 18 and the second light 34 that is emitted by the second lighting unit 20 takes place within the light guide 30. The first and the second light 32, 34 coupled into the light guide 30 separately at the first circular end 42 merge to a third light 33 of a third colour that is in die CIE 1931 chromaticity diagram represented by the colour point C1 lying within the first colour window 19a. At the output coupling portion 36 arranged at the second circular end 44, the third light 33 is outcoupled to provide illumination for a daytime running light (DRL).

In the second operation mode, only the second lighting unit 20 couples light 34 into the light guide 30 that passes through the light guide 30 to the output coupling portion 36 where it is outcoupled to provide illumination for a turn light.

Hence, in both operation modes, the second lighting unit 20 couples light into the light guide 30. Thus, the LEDs 22 and their common light emitting layer 26 of the second lighting unit 20 are used in an efficient way because they are used for two applications: daytime running light and turn light.

All of the LEDs 22 shown in FIG. 2 are used to realise a daytime running light. If it is desired to use the lighting assembly 14 as a turn light, only the LEDs 22 of the second lighting unit 20 that enclose the LEDs 22 of the first lighting unit 18 are operated.

Figure 6A:
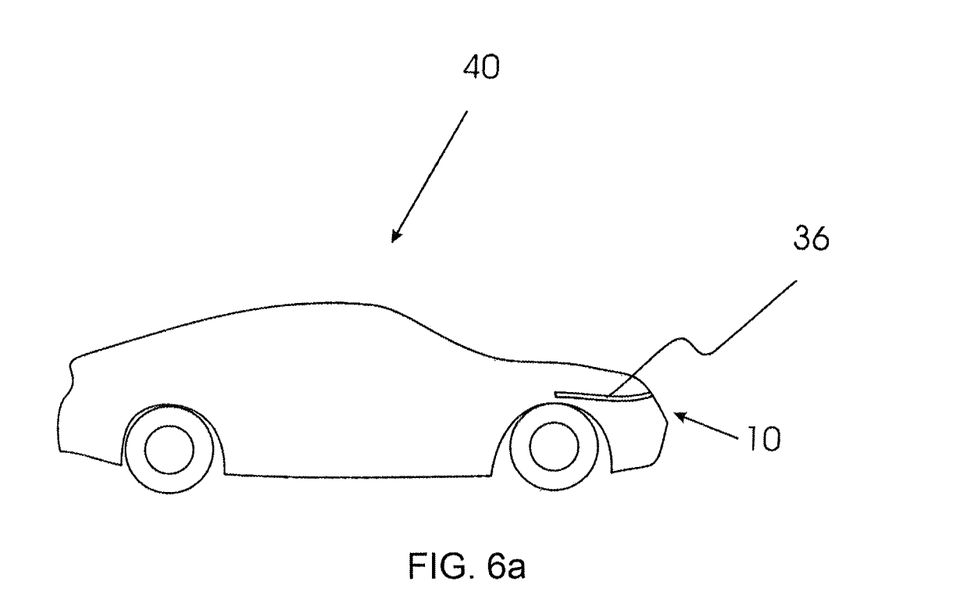
FIGS. 6a and 6b schematically show vehicles according to different embodiments of the invention.

FIG. 6a shows a motor vehicle 40 including the automotive lighting device 10. The automotive lighting device 10 is employed at the front side of the car 40 both as a daytime running light and as a turn light. The output coupling portions 36 of the automotive lighting devices 10 are arranged alongside the vehicle body.

A second embodiment coincides in most features with the first embodiment. The only differences exist in the colours of the lighting units and in the colours of the emitted lights. Further the first colour of the first lighting unit is not within the first colour range.

Figure 4B:
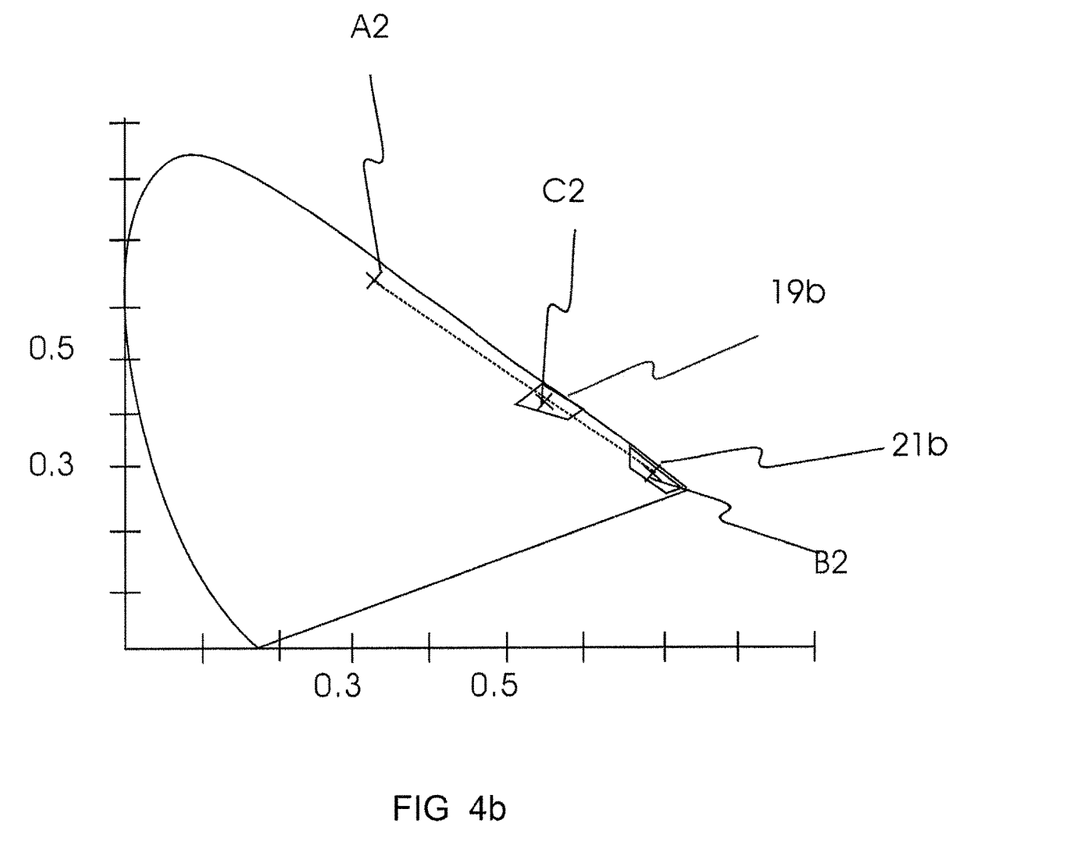

FIG. 4b shows a CIE 1931 chromaticity diagram to illustrate the second embodiment. This FIG. 4b refers to FIG. 4a and only the differences of this embodiment compared to the embodiment illustrated in FIG. 4a are described. There are two different, disjoint colour windows 19b, 21b. A first colour window 19b is an amber colour window defining permissible colours for a turn light according to the regulation ECE-R6. A second colour window 21b is an red colour window defining permissible colours for a stoplight according to the regulation ECE-R7.

The colour of the first light 32 is designated as colour point A2 which is a green colour point. The colour of the second light 34 is represented by the colour point B2 within the second (red) colour window 21b.

The colour of a third light 33 obtained from mixing the first light 32 and second light 34 is designated as color point C2. In the CIE 1931 chromaticity diagram, the colour point C2 lies between the colour points A2 and the colour point B2. Therefore, the colour corresponding to the colour point C2 is a combination of the colours corresponding to the colour points A2 and B2. As shown in FIG. 4b, the colour point C2 is located within the first (amber) colour window 19b. Thus, the colour point C2 represents an amber colour hue permissible as a turn light according to ECE-R6.

Figure 6B:
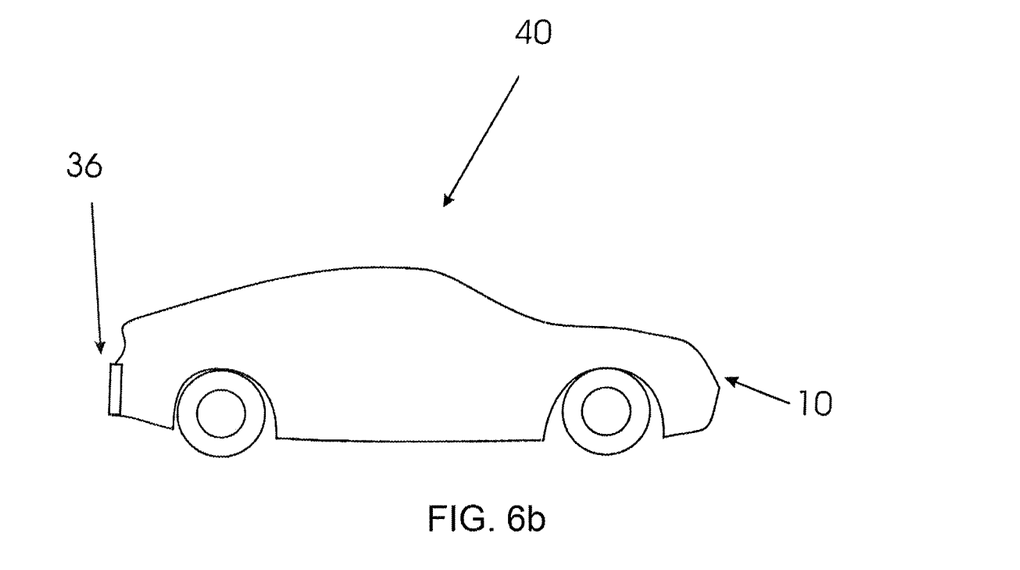

FIG. 6b shows a motor vehicle 40 including the automotive lighting device according to the second embodiment at the back side of the car 40 both as a turn light and as a stoplight. The output coupling portion 36 of the automotive lighting device 10 is arranged alongside the vehicle body.

A third embodiment coincides in most features with the first embodiment. The only difference lies in the colour of the light 32 emitted by the first lighting unit 18, which in the third embodiment is not within the first colour range 19a.

Figure 4C:
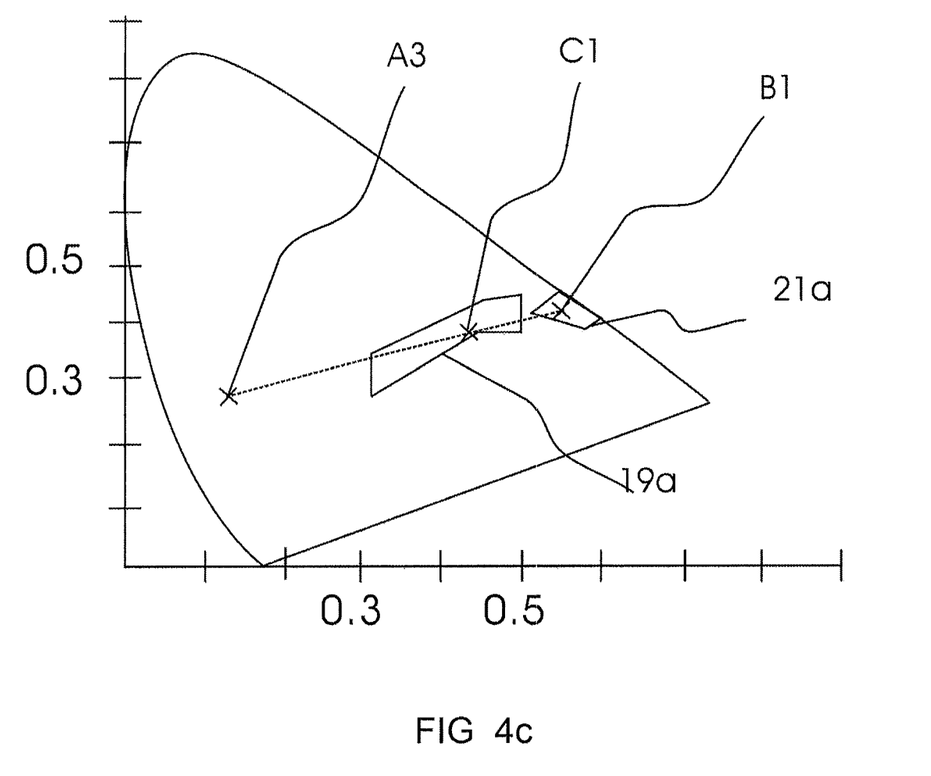

FIG. 4c shows a CIE 1931 chromaticity diagram to illustrate the third embodiment. FIG. 4c refers to FIG. 4a and only the differences of this embodiment compared to the embodiment illustrated in FIG. 4a are described.

The colour point A3 represents a cyan colour. In this embodiment, the first light 32 is of this cyan colour A3. The colour B1 of the second light 34 and the colour C1 of the third light 33 are the same as described above regarding FIG. 4a. Thus, the third light 33 that is of the white colour C1 is obtained by mixing light of a cyan colour A3 with light of amber colour B1. Compared to FIG. 4a, the colour point B1 of the second light 32 and the colour point C1 of the third light 33 are the same. Only the colour points A3 and A1 differ but they are on the same straight line. In the first embodiment the colour C1 of the third light 33 is approximately arranged at same distances from the colours A1 of the first light 32 and B1 of the second light 34, which may be achieved by providing first and second light 32, 34 with approximately the same luminous flux. In the third embodiment, the ratio of the luminous flux of the first light 32 and the luminous flux of the second light 34 differs to the analogous ratio of the first embodiment. In the third embodiment, the luminous flux of the second light 34 is higher than the luminous flux of the first light 32, such that the resulting colour C1 of the third light 33 is closer to the amber colour B1 than to the cyan colour A3.

While the invention has been illustrated and described in detail in the drawings and foregoing description, such illustration and description are to be considered illustrative or exemplary and not restrictive; the invention is not limited to the disclosed embodiments.

Both the number and the arrangement of LEDs 22 within the lighting units 18, 20 shown in FIG. 2 are to be considered exemplary. While in the embodiment of FIG. 2 the first lighting unit is shown comprising 15 LEDs 22 and the second lighting unit 20 is shown comprising 6 LEDs 22, this is only an example. The number of LEDs 22 in both the first and second lighting unit 18, 20 may be chosen differently. For example, while in the example shown a ratio defined as the number of LEDs 22 of the first lighting unit 18 divided by the number of LEDs 22 of the second lighting unit 20 is 2:5, the ratio may have a different value in other embodiments, e.g. in a range of 1:4 to 4:1.

While the lighting units 18, 20 are disposed to provide, in nominal operation, a luminous flux of 350-500 lm, different types or a different number of LEDs 22 may also be chosen to obtain a luminous flux outside of this range.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

The mere fact that certain measures are recited in mutually different dependent claims or different embodiments does not indicate that a combination of these measured cannot be used to advantage.

Any reference signs in the claims should not be construed as limiting the scope.

What is claimed is:

1. An automotive lighting device, comprising:
a first lighting unit configured to emit a first light of a first colour, the first lighting unit including at least a first light guide;
a second lighting unit configured to emit a second light of a second colour corresponding to a second automotive lighting function, the second lighting unit including at least a second light guide, the second lighting unit being substantially surrounded by said first lighting unit; and
a mixing space spatially separated from at least one of the first lighting unit and the second lighting unit, the mixing space including at least one optical element included within the mixing space, the at least one optical element configured to alter an emission direction of light emitted from at least one of the first lighting unit and the second lighting unit to merge the first light and the second light to a third light of a third colour corresponding to a first automotive lighting function, the mixing space including at least a third light guide.

2. The automotive lighting device according to claim 1, wherein
the first automotive lighting function is a daytime running light and the first colour range is defined as a first region in the CIE 1931 colour space, the first region being a polygon with the vertices (0.31, 0.348), (0.453, 0.44), (0.5, 0.44), (0.5, 0.38), (0.44, 0.38), and (0.31, 0.283), and
the second lighting function is a turn light and the second colour range is defined as a second region in the CIE 1931 colour space, the second region being a geometric shape with the vertices (0.5545, 0.425), (0.56, 0.44), (0.609, 0.39), and (0.597, 0.39).

3. The automotive lighting device according to claim 1, wherein
the first automotive lighting function is a turn light and the first colour range is defined as a first region in the CIE 1931 colour space, the first region being a geometric shape with the vertices (0.5545, 0.425), (0.56, 0.44), (0.609, 0.39), and (0.597, 0.39), and
the second automotive lighting function is a stoplight and the second colour range is defined as a second region in the CIE 1931 colour space, the second region being a geometric shape with the vertices (0.65, 0.33), (0.67, 0.33), (0.735, 0.265), and (0.721, 0.259).

4. The automotive lighting device according to claim 1, wherein the first colour is within the first colour range.

5. The automotive lighting device according to claim 1, wherein the first lighting unit and the second lighting unit are independently controllable.

6. The automotive lighting device according to claim 1, wherein the automotive lighting device is disposed to be operated in a first and in a second operation mode, wherein the first operation mode the third light is emitted and in the second operation mode the second light is emitted.

7. The automotive lighting device according to claim 1, wherein the luminous flux of one of the first lighting unit and the second lighting unit is variable relative to the other one.

8. The automotive lighting device according to claim 1, wherein the first lighting unit and the second lighting unit each comprises a plurality of LED elements and is at least partially covered by a common light emitting layer.

9. The automotive lighting device according to claim 1, wherein the first lighting unit and the second lighting unit are arranged adjacent to each other.

10. The automotive lighting device according to claim 1, wherein at least one lighting unit of the first lighting unit and the second lighting unit encloses the other lighting unit at least partially.

11. The automotive lighting device according to claim 1, wherein an optical element is arranged within the mixing space.

12. The automotive lighting device according to claim 11, wherein the optical element is a light guide, comprising an output coupling area.

13. A vehicle comprising:
at least one automotive lighting device including:
a first lighting unit configured to emit a first light of a first colour, the first lighting unit including at least a first light guide;

a second lighting unit configured to emit a second light of a second colour corresponding to a second automotive lighting function, the second lighting unit including at least a second light guide, the second lighting unit being substantially surrounded by said first lighting unit; and a mixing space spatially separated from at least one of the first lighting unit and the second lighting unit, the mixing space including at least one optical element included within the mixing space, the at least one optical element configured to alter an emission direction of light emitted from at least one of the first lighting unit and the second lighting unit to merge the first light and the second light to a third light of a third colour corresponding to a first automotive lighting function, the mixing space including at least a third light guide.

14. A method of operating at least one automotive lighting device according to claim 1, wherein the automotive lighting device is selectively operated in a first operation mode, wherein the lighting units are operated simultaneously and in a second operation mode wherein the second lighting unit is operated.

15. The automotive lighting device of claim 1, wherein the mixing optic comprises a diffuser.

\* \* \* \* \*